United States Patent
Lewis, III

(10) Patent No.: US 12,202,751 B2
(45) Date of Patent: Jan. 21, 2025

(54) SYSTEMS AND METHODS FOR PRODUCING SATURATED OXYGEN WATER

(71) Applicant: Tom Lewis, III, Murrysville, PA (US)

(72) Inventor: Tom Lewis, III, Murrysville, PA (US)

(73) Assignee: Tom Lewis, III, Murrysville, PA (US)

( * ) Notice: Subject to any disclaimer, the term of this patent is extended or adjusted under 35 U.S.C. 154(b) by 0 days.

(21) Appl. No.: 18/484,804

(22) Filed: Oct. 11, 2023

(65) Prior Publication Data

US 2024/0083786 A1    Mar. 14, 2024

Related U.S. Application Data

(63) Continuation of application No. 17/404,324, filed on Aug. 17, 2021, now Pat. No. 11,820,682.

(60) Provisional application No. 63/084,206, filed on Sep. 28, 2020.

(51) Int. Cl.
  *C02F 1/68* (2023.01)
  *A23L 2/54* (2006.01)
(52) U.S. Cl.
  CPC ............... *C02F 1/685* (2013.01); *A23L 2/54* (2013.01)
(58) Field of Classification Search
  CPC .................................. A23L 2/54; C02F 1/685
  See application file for complete search history.

(56) References Cited

U.S. PATENT DOCUMENTS

| | | | |
|---|---|---|---|
| 5,087,377 A | 2/1992 | Josefik | |
| 7,288,574 B2 | 10/2007 | Eckert | |
| 8,157,972 B2 | 4/2012 | Hegel et al. | |
| 11,820,682 B2 * | 11/2023 | Lewis, III | ............... C02F 1/727 |
| 2004/0089442 A1 | 5/2004 | Goodson et al. | |
| 2010/0151041 A1 | 6/2010 | Eckert | |
| 2013/0041312 A1 | 2/2013 | Eckert | |
| 2015/0274557 A1 | 10/2015 | Watson et al. | |
| 2016/0030471 A1 | 2/2016 | Eckert | |
| 2018/0149303 A1 * | 5/2018 | Eckert | ................. A61L 26/0019 |

FOREIGN PATENT DOCUMENTS

| | | |
|---|---|---|
| CN | 108992337 B | 11/2020 |
| WO | 1995021795 A1 | 8/1995 |
| WO | WO 2012/140273 A1 * | 10/2012 |
| WO | 2014075191 A1 | 5/2014 |

OTHER PUBLICATIONS

Abstract of WO 2012/140273 A1 (Year: 2012).*
International Search Report for International Patent Application No. PCT/US2021/046258, mailed Dec. 1, 2021.
Written Opinion for International Patent Application No. PCT/US2021/046258, mailed Dec. 1, 2021.
Reading, et al., "Oxygen absorption by skin exposed to oxygen supersaturated water", Can. J. Physiol. Pharmacol., vol. 90, 2012, pp. 515-525.

* cited by examiner

*Primary Examiner* — Charles S Bushey
(74) *Attorney, Agent, or Firm* — K&L Gates LLP

(57) ABSTRACT

The present disclosure provides systems and methods for producing saturated oxygen water. The present disclosure also provides methods of increasing a concentration of dissolved oxygen in blood of a human subject.

29 Claims, 2 Drawing Sheets

SYSTEMS AND METHODS FOR PRODUCING SATURATED OXYGEN WATER

RELATED APPLICATIONS

The present application claims priority under 35 U.S.C. § 120 as a continuation of co-pending U.S. patent application Ser. No. 17/404,324, filed Aug. 17, 2021, issued as U.S. Pat. No. 11,820,682, which claims the benefit of U.S. Provisional Application No. 63/084,206 filed Sep. 28, 2020, all of which are incorporated herein in their entirety by reference.

FIELD

The present disclosure relates to systems and methods for producing saturated oxygen water.

BACKGROUND

Oxygen is one of Earth's most plentiful elements and comprises about 21% of the Earth's atmosphere. Besides the lungs, human skin is the largest and only organ directly exposed to atmospheric oxygen.

Tissues within the human body need an adequate supply of oxygen in order to function. Studies have demonstrated that oxygen can be supplied through the skin at higher levels than atmospheric oxygen.

Despite efforts from researchers and medical professionals worldwide, there still remains a critical need to develop ways to enhance oxygen availability to the human body through the skin.

SUMMARY

This section provides a general summary of the disclosure, and is not comprehensive of its full scope or all of its features.

Provided herein is a system for producing saturated oxygen water. The system comprises: a first-oxygen injector configured to inject oxygen gas into water to form an oxygen-water mixture, a pressure pump configured to increase dissolved oxygen in the oxygen-water mixture thereby producing saturated oxygen water, a catalytic oxygen capacitor configured to maintain dissolved oxygen in the saturated oxygen water at saturated oxygen equilibrium, and an open chamber configured to hold the saturated oxygen water.

Also provided herein is a method of producing saturated oxygen water. The method comprises: producing an oxygen-water mixture, using the oxygen-water mixture to produce saturated oxygen water, and using a catalytic oxygen capacitor to maintain dissolved oxygen in the saturated oxygen water at saturated oxygen equilibrium.

Also provided herein is a method of increasing a concentration of dissolved oxygen in blood of a human subject. The method comprises: producing an oxygen-water mixture, using the oxygen-water mixture to produce saturated oxygen water, using a catalytic oxygen capacitor to maintain dissolved oxygen in the saturated oxygen water at saturated oxygen equilibrium, filling an open chamber with the saturated oxygen water, inserting at least a portion of the human subject into the open chamber for a period of time, and increasing the concentration of dissolved oxygen in blood of the human subject.

The foregoing summary is illustrative only and is not intended to be in any way limiting. In addition to the illustrative examples and features described herein, further aspects, examples, objects and features of the disclosure will become fully apparent from the drawings and the detailed description and the claims.

BRIEF DESCRIPTION OF THE DRAWINGS

Various aspects of systems and methods disclosed and described in this specification can be better understood by reference to the accompanying figures, in which.

DETAILED DESCRIPTION

Systems for Producing Saturated Oxygen Water

Figure 1:
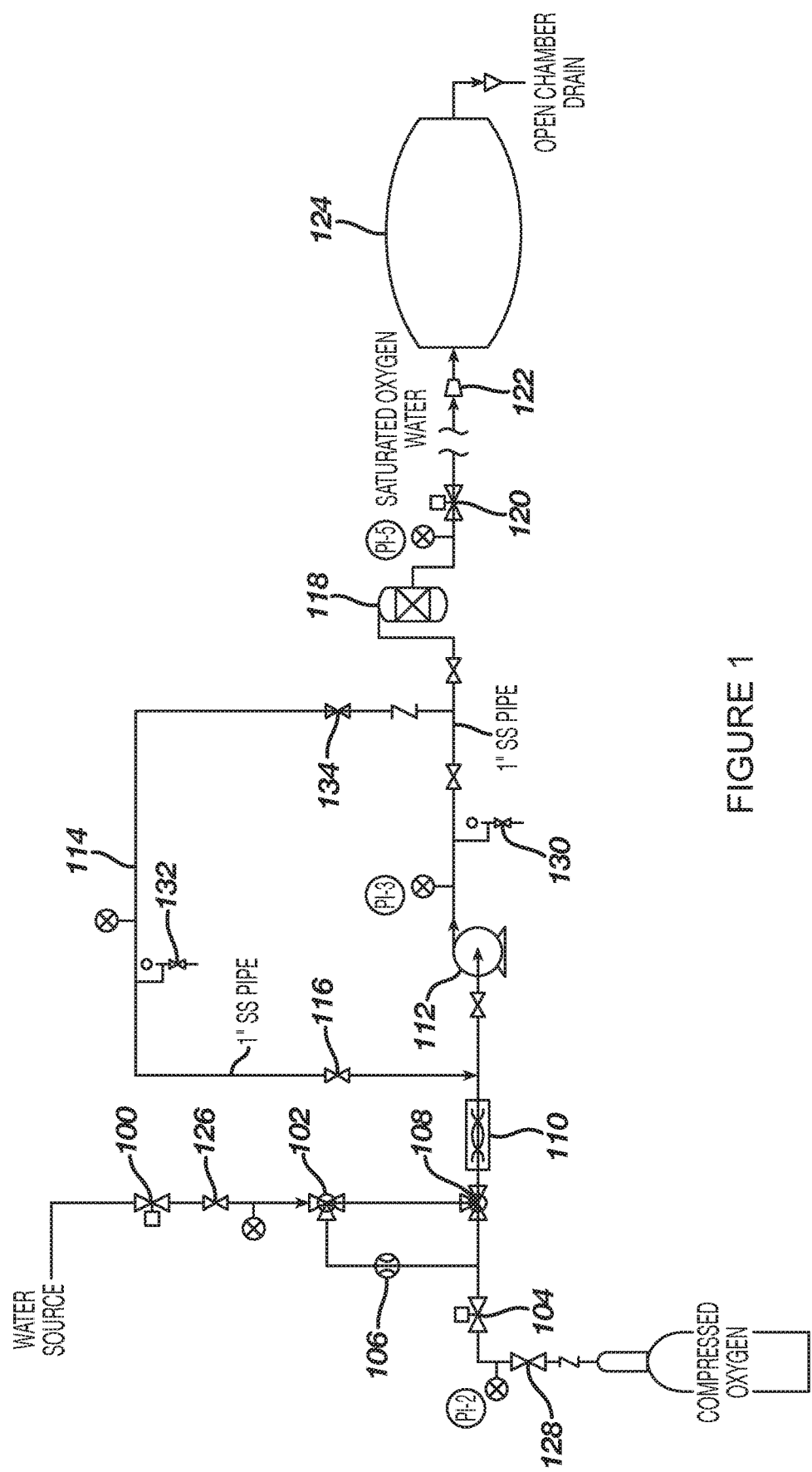
FIG. 1 shows a flow diagram illustrating a system for producing saturated oxygen water.

The systems provided herein can produce saturated oxygen water. The saturated oxygen water can be supplied to a human subject or a portion of the human subject via the skin to enhance oxygen availability to human tissues throughout body.

The systems can comprise one or more oxygen injectors, one or more pressure pumps, and one or more catalytic oxygen capacitors. The systems can further comprise one or more open chambers.

The systems disclosed herein can comprise one or more oxygen injectors (i.e., a first oxygen injector, a second oxygen injector, or more). The one or more oxygen injector can be Mazzei® venturi injectors (Bakersfield, California, USA). The one or more oxygen injectors can be configured to inject oxygen gas into water to form an oxygen-water mixture. The one or more oxygen injectors can also inject oxygen gas into the oxygen-water mixture. "Oxygen-water mixture" as disclosed herein is a mixture of oxygen gas and water with a concentration of dissolved oxygen from 10 mg/l to 40 mg/l. For example, the dissolved oxygen concentration of the oxygen-water mixture (first oxygen-water mixture, second oxygen-water mixture, etc.) can be any one of 10 mg/l to 40 mg/l, 15 mg/l to 40 mg/l, 20 mg/l to 40 mg/l, 25 mg/l to 40 mg/l, 30 mg/l to 40 mg/l, or 35 mg/l to 40 mg/l.

In certain embodiments, the systems disclosed herein can comprise a first oxygen injector (102) configured to inject oxygen gas into water to form an oxygen-water mixture. For example, the first oxygen injector (102) can receive oxygen gas from an oxygen source, receive water from a water source, and inject the oxygen gas into the water, thereby forming the oxygen-water mixture. The oxygen gas can comprise at least 95%, 96%, 97%, 98%, 99%, or 99.5% oxygen.

In certain embodiments, the systems disclosed herein can further comprise a second oxygen injector (108) configured to inject oxygen gas into the oxygen-water mixture to increase the concentration of dissolved oxygen in the oxygen-water mixture. For example, the second oxygen injector (108) can receive the oxygen gas, receive the oxygen-water mixture, and inject the oxygen gas into the oxygen-water mixture, thereby forming an oxygen water mixture with a concentration of dissolved oxygen greater than the concentration of dissolved oxygen in the oxygen-water mixture prepared using only the first oxygen injector.

In certain embodiments, the systems disclosed herein can further comprise oxygen injectors (not shown in FIG. 1) in addition to the first and second oxygen injectors.

In certain embodiments, the additional oxygen injectors (third oxygen injector, fourth oxygen injector, etc.) can be configured to inject oxygen gas into the oxygen-water mixture to increase the concentration of dissolved oxygen in the oxygen-water mixture. For example, the additional oxygen injectors can receive the oxygen gas, receive the oxygen-water mixture, and inject the oxygen gas into the oxygen-water mixture, thereby forming an oxygen water mixture with a concentration of dissolved oxygen greater than the concentration of dissolved oxygen in the oxygen-water mixture prepared using the first oxygen injector and second oxygen injector.

In certain other embodiments, the additional oxygen injectors (third oxygen injector, fourth oxygen injector, etc.) can be configured to inject oxygen gas into saturated oxygen water to increase the concentration of dissolved oxygen in the saturated oxygen water. For example, the additional oxygen injectors can receive the oxygen gas, receive the saturated oxygen water from the pressure pump, and inject the oxygen gas into the saturated oxygen water, thereby forming a saturated oxygen water with a concentration of dissolved oxygen greater than the concentration of dissolved oxygen in the saturated oxygen water prepared using the first oxygen injector, second oxygen injector, and pressure pump.

In certain embodiments, the oxygen injector can be located prior to the pressure pump. In certain embodiments, the oxygen injector can be located after the pressure pump.

In certain embodiments, for systems that include two or more oxygen injectors, the two or more oxygen injectors can be located prior to the pressure pump and are in series. In certain embodiments, one or more oxygen injector can be located prior to the pressure pump and one or more oxygen injector can be located after the pressure pump.

As illustrated in FIG. 1, the systems disclosed herein can comprise one or more valves located between the water source and the first oxygen injector (102). For example, the system can comprise a water valve (100) that can be opened and closed to control water entry into the system from a water source. The water source can include municipal water, sea water, fresh water, aquaculture water, irrigation water, industrial water, tap water, well water, distilled water, purified water, reverse osmosis, and wastewater. The water source can comprise 5-10 mg/l, 6-10 mg/l, 7-10 mg/l, 8-10 mg/l, 9-10 mg/l, or 9.5-10 mg/l of dissolved oxygen. The water source can be heated from an external heating source, such as a hot water heater. The water source can have temperature between 55-125° F., 55-120° F., 55-115° F., 55-110° F., 55-105° F., 55-100° F., 65-125° F., 65-120° F., 65-115° F., 65-110° F., 65-105° F., or 65-100° F. The system can also comprise a water inlet valve (126) that controls the water flow rate at 1-10 gallons per minute (GPM). The water inlet valve (126) can comprise a pressure gauge to measure and maintain a desired inlet water pressure of 80-120 psi.

As illustrated in FIG. 1, the systems disclosed herein can comprise one or more valves located between the oxygen source and the first oxygen injector (102) and the second oxygen injector (108), if the second oxygen injector is included in the system. For example, the system can comprise a compressed oxygen shut off valve (128) that can be opened and closed to control the flow of oxygen to the system. The compressed oxygen shut off valve (128) can comprise a pressure gauge to observe the oxygen pressure. The oxygen source or compressed oxygen can comprise at least 95%, 96%, 97%, 98%, 99%, or 99.5% oxygen. The gas regulator valve (104) can control the oxygen pressure between 20 to 250 psi.

As illustrated in FIG. 1, the systems disclosed herein can comprise one or more meters located between the oxygen source and the first oxygen injector (102). For example, a gas rotameter (106) can be located between the oxygen source and first oxygen injector. The gas rotameter (106) can measure the volume metric flow rate of oxygen. The flow rate of oxygen can be between 0.1 to 1000 ml/minute for the systems disclosed herein.

In certain embodiments, the systems disclosed herein can further comprise a purifying device (not shown in FIG. 1). The purifying device can be located between the water source and the first oxygen injector (102) and is configured to remove particulates, dissolved solids, ions, or a combination thereof from the water. In certain embodiments, the purifying device can be located directly before the first oxygen injector (102).

The systems disclosed herein can comprise one or more pressure pumps (112). The one or more pressure pumps can include, but are not limited to, the following designs: a booster design, a turbine design, and a centrifugal design.

In certain embodiments, the systems disclosed herein can comprise a pressure pump configured to increase dissolved oxygen in the oxygen-water mixture thereby producing saturated oxygen water. For example, the pressure pump can receive the oxygen-water mixture into the suction side of the pressure pump, pressurize the oxygen-water mixture to a saturated state, thereby producing saturated oxygen water.

The saturated oxygen water discharged from the pressure pump has a concentration of dissolved oxygen greater than the concentration of dissolved oxygen in the oxygen-water mixture that was received by the pressure pump. "Saturated oxygen water" as disclosed herein is a mixture of oxygen gas and water that is pressurized and discharged from a pressure pump and has a concentration of dissolved oxygen from 40 mg/l to 70 mg/l. For example, the dissolved oxygen concentration of the saturated oxygen water discharged from the pressure pump can be any one of 40 mg/l to 70 mg/l, 45 mg/l to 70 mg/l, 50 mg/l to 70 mg/l, 55 mg/l to 70 mg/l, 60 mg/l to 70 mg/l, or 65 mg/l to 70 mg/l, at least 40 mg/l, at least 45 mg/ml, at least 50 mg/l, at least 55 mg/l, at least 60 mg/l, at least 65 mg/l, or at least 70 mg/l.

Saturated oxygen water discharged from the pressure pump can either enter a catalytic oxygen capacitor (118), a recycle loop (114), or an additional oxygen injector.

In certain embodiments, the systems disclosed herein can comprise a pressure pump configured to increase dissolved oxygen in saturated oxygen water. For example, the suction side of the pressure pump can receive saturated oxygen water from the recycle loop (114), the saturated oxygen water can be pressurized to a saturated state, thereby producing saturated oxygen water with a concentration of dissolved oxygen greater than the concentration of dissolved oxygen in the saturated oxygen water discharged from a pressure pump in systems that do not comprise a recycle loop.

The systems disclosed herein can further comprise a sample port with a valve (130) located after the pressure pump (112) and before the catalytic oxygen capacitor (118) or the recycle loop (114). The sample port (130) can measure the concentration of dissolved oxygen in the saturated oxygen water discharged from the pressure pump.

The system disclosed herein can comprise one or more catalytic oxygen capacitors (118).

In certain embodiments, the systems disclosed herein can comprise a catalytic oxygen capacitor (118) configured to receive saturated oxygen water and maintain dissolved oxygen in the saturated oxygen water at saturated oxygen equilibrium. For example, the catalytic oxygen capacitor (118) can be configured to absorb dissolved oxygen when the dissolved oxygen in the saturated oxygen water is at an equilibrium concentration greater than the equilibrium concentration in the catalytic oxygen capacitor and the catalytic oxygen capacitor (118) can be configured to release dissolved oxygen when the dissolved oxygen in the saturated oxygen water is at a concentration less than the equilibrium concentration in the catalytic oxygen capacitor.

Figure 2:
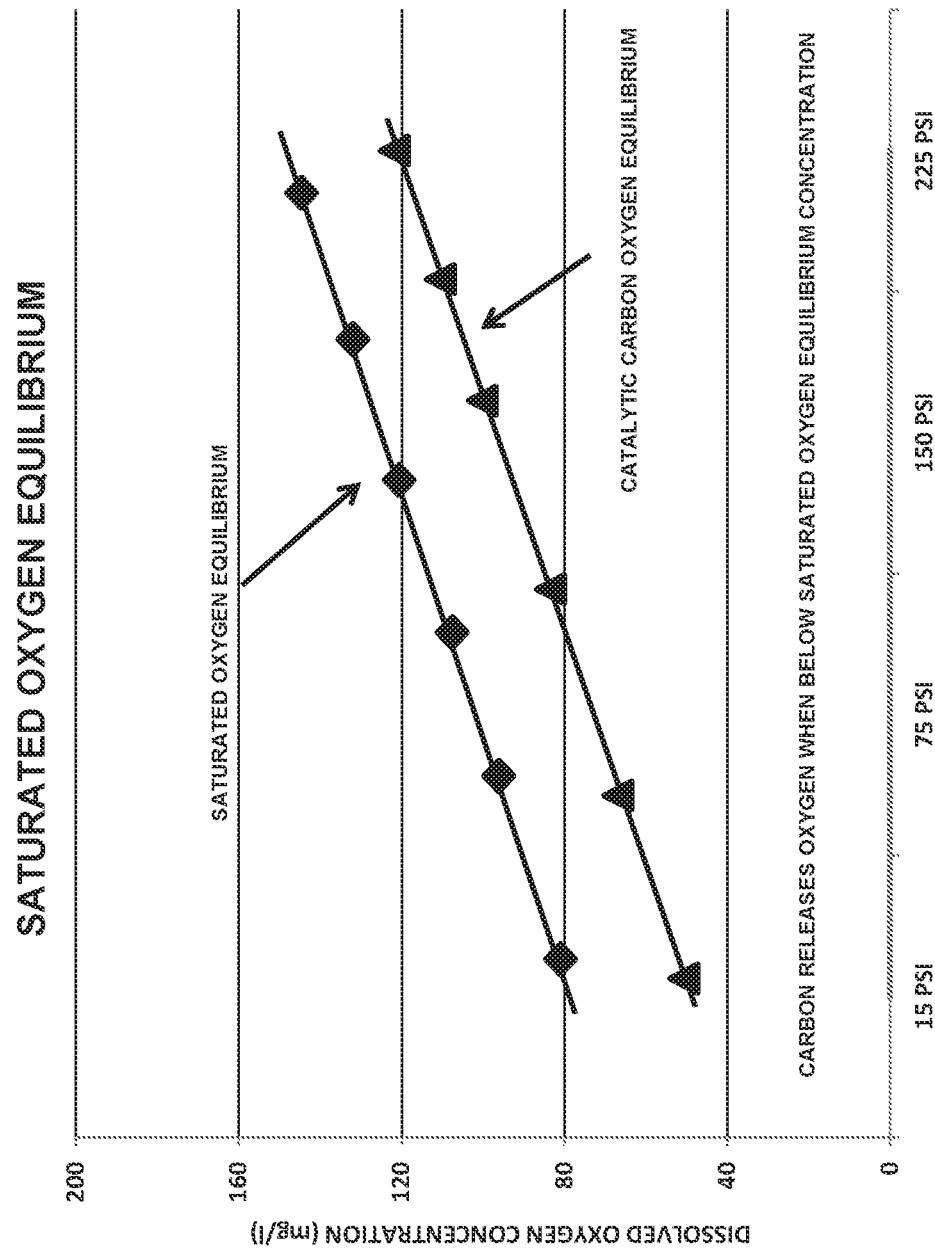
FIG. 2 is a graph illustrating saturated oxygen equilibrium and catalytic carbon oxygen equilibrium.

Without wishing to be bound by theory, granular activated carbon macroscopically adsorbs dissolved oxygen in saturated oxygen water. As illustrated in FIG. 2, the macroscopic adsorption of dissolved oxygen on granular activated carbon can occur when the dissolved oxygen in the saturated oxygen water is at an equilibrium concentration greater than 30 mg/l, greater than 40 mg/l, greater than 50 mg/l, greater than 60 mg/l, greater than 70 mg/l, greater than 80 mg/l, greater than 90 mg/l, greater than 100 mg/l, greater than 110 mg/l, greater than 120 mg/l, greater than 130 mg/l, greater than 140 mg/l, greater than 150 mg/l, and greater than 155 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 40 mg/l to 60 mg/l. In this embodiment, the catalytic oxygen capacitor (118) can be configured to absorb dissolved oxygen when the dissolved oxygen in the saturated oxygen water is at an equilibrium concentration greater than 60 mg/l and the catalytic oxygen capacitor (118) can be configured to release dissolved oxygen when the dissolved oxygen concentration in the saturated oxygen water is less than 40 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 45 mg/l to 60 mg/l. In this embodiment, the catalytic oxygen capacitor (118) can be configured to absorb dissolved oxygen when the dissolved oxygen in the saturated oxygen water is at an equilibrium concentration greater than 60 mg/l and the catalytic oxygen capacitor (118) can be configured to release dissolved oxygen when the dissolved oxygen concentration in the saturated oxygen water is less than 45 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 50 mg/l to 60 mg/l. In this embodiment, the catalytic oxygen capacitor (118) can be configured to absorb dissolved oxygen when the dissolved oxygen in the saturated oxygen water is at an equilibrium concentration greater than 60 mg/l and the catalytic oxygen capacitor (118) can be configured to release dissolved oxygen when the dissolved oxygen concentration in the saturated oxygen water is less than 50 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 55 mg/l to 60 mg/l. In this embodiment, the catalytic oxygen capacitor (118) can be configured to absorb dissolved oxygen when the dissolved oxygen in the saturated oxygen water is at an equilibrium concentration greater than 60 mg/l and the catalytic oxygen capacitor (118) can be configured to release dissolved oxygen when the dissolved oxygen concentration in the saturated oxygen water is less than 55 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 57.5 mg/l to 60 mg/l. In this embodiment, the catalytic oxygen capacitor (118) can be configured to absorb dissolved oxygen when the dissolved oxygen in the saturated oxygen water is at an equilibrium concentration greater than 60 mg/l and the catalytic oxygen capacitor (118) can be configured to release dissolved oxygen when the dissolved oxygen concentration in the saturated oxygen water is less than 57.5 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 60 mg/l to 70 mg/l. In this embodiment, the catalytic oxygen capacitor (118) can be configured to absorb dissolved oxygen when the dissolved oxygen in the saturated oxygen water is at an equilibrium concentration greater than 70 mg/l and the catalytic oxygen capacitor (118) can be configured to release dissolved oxygen when the dissolved oxygen concentration in the saturated oxygen water is less than 60 mg/l.

In certain embodiments, the systems disclosed herein can comprise a catalytic oxygen capacitor (118) configured to receive saturated oxygen water and maintain dissolved oxygen in the saturated oxygen water at a saturated oxygen equilibrium concentration of at least 65 mg/l to 70 mg/l. In this embodiment, the catalytic oxygen capacitor (118) can be configured to absorb dissolved oxygen when the dissolved oxygen in the saturated oxygen water is at an equilibrium concentration greater than 70 mg/l and the catalytic oxygen capacitor (118) can be configured to release dissolved oxygen when the dissolved oxygen concentration in the saturated oxygen water is less than 65 mg/l.

The catalytic oxygen capacitor (118) can comprise a filter comprising absorption media. The absorption media can be an activated carbon, an ion exchange resin, an organic absorbent, or an inorganic absorbent.

As illustrated in FIG. 1, the catalytic oxygen capacitor (118) can be located after the pressure pump (112) and before the oxygen bubble nozzle (122) and open chamber (124).

The systems disclosed herein can comprise a saturated oxygen water control valve (120) after the catalytic oxygen capacitor (118) and before the oxygen bubble nozzle (122). The saturated oxygen water control valve (120) can be opened and closed to control the flow of saturated oxygen water to the oxygen bubble nozzle (122) and open chamber (124).

The systems disclosed herein can further comprise one or more open chambers (124).

In certain embodiments, the open chamber (124) can be configured to hold the saturated oxygen water. In certain embodiments, the open chamber can be an atmospheric open chamber. In certain embodiments, the open chamber can have a return line back to the water source. In certain embodiments, the open chamber can have a return line back to the water source with a filter located before the water source. In certain other embodiments, the open chamber can comprise an overflow connected to a drain. In certain embodiments, the open chamber (124) can be a tank, a bathtub, or a footbath.

The saturated oxygen water in the open chamber can comprise dissolved oxygen at a concentration of at least 40 mg/l, at least 45 mg/l, at least 50 mg/l, at least 55 mg/l, at 60 mg/l, at least 65 mg/l, at least 40 up to 60 mg/l, at least 45 up to 60 mg/l, at least 50 up to 60 mg/l, at least 55 up to 60 mg/l, or at least 57.5 up to 60 mg/l. The saturated oxygen water in the open chamber can comprise dissolved oxygen at a concentration of at least 40 up to 60 mg/l, at least 45 up to 60 mg/l, at least 50 up to 60 mg/l, at least 55 up to 60 mg/l, or at least 57.5 up to 60 mg/l when at a pressure of 60 psi to 325 psi and a temperature of 60° F. to 140° F. The saturated oxygen water in the open chamber can comprise nanobubbles comprising a diameter of less than 1 μm.

The systems disclosed herein can further comprise one or more static mixers (110).

In certain embodiments, the static mixer (110) can be configured to dissolve oxygen in the oxygen-water mixture without using an external energy source. In certain embodiments, the static mixer (110) can be located before the pressure pump. In certain other embodiments, the static mixer (110) can be located after the pressure pump. In certain embodiments, one or more static mixers (110) can be located before the pressure pump and one or more static mixer can be located after the pressure pump.

The systems disclosed herein can comprise a recycle loop (114) to return a portion of the saturated oxygen water to the suction side of the pressure pump (112) to further increase the concentration of dissolved oxygen in the saturated oxygen water.

As illustrated in FIG. 1, the systems disclosed herein can comprise a sample port with valve (132) located within the recycle loop (114). The sample port (132) can measure the concentration of dissolved oxygen in the saturated oxygen water in the recycling loop.

As illustrated in FIG. 1, the systems disclosed herein can comprise one or more valves (116, 134) located in the recycling loop. For example, the system can comprise a shut off valve (134) that can be opened and closed to control the entry of saturated oxygen water into the recycling loop. The system can further comprise a valve (116) that can be opened and closed to control the exit of saturated oxygen water out of the recycling loop and back into the suction side of the pressure pump (112). The systems disclosed herein can further comprise a pressure gauge in the recycling loop to observe the oxygen pressure.

Methods of Producing Saturated Oxygen Water

The methods provided herein can produce saturated oxygen water. The saturated oxygen water can be provided to a human subject or a portion of the human subject via the skin to enhance oxygen availability to human tissues throughout body.

The methods disclosed herein can comprise producing an oxygen-water mixture, using the oxygen-water mixture to produce saturated oxygen water, and using a catalytic oxygen capacitor to maintain dissolved oxygen in the saturated oxygen water at saturated oxygen equilibrium.

In certain embodiments, the producing the oxygen-water mixture can comprise passing water through a first oxygen injector and injecting oxygen gas into the water via the first oxygen injector to produce the oxygen-water mixture. The oxygen gas injected into the water to produce the oxygen-water mixture can flow in the same direction as the water.

In certain embodiments, the producing the oxygen-water mixture can comprise passing water through a first oxygen injector, injecting oxygen gas into the water via the first oxygen injector to produce a first oxygen-water mixture and passing the first oxygen-water mixture through a second oxygen injector to produce a second oxygen-water mixture. The oxygen gas injected into the first oxygen-water mixture can flow in the same direction as the first oxygen-water mixture. The second oxygen-water mixture can have a concentration of dissolved oxygen greater than the concentration of dissolved oxygen in the first oxygen-water mixture.

In certain embodiments, the using the oxygen-water mixture to produce saturated oxygen water can comprise passing the oxygen-water mixture through a pressure pump. The first oxygen-water mixture discharged from the first oxygen injector or the second oxygen-water mixture discharged from the second oxygen injector can be passed through the pressure pump to produce saturated oxygen water.

In certain embodiments, the using a catalytic oxygen capacitor to maintain dissolved oxygen in the saturated oxygen water at saturated oxygen equilibrium can comprise passing the saturated oxygen water through a catalytic oxygen capacitor.

As illustrated in FIG. 2, the catalytic oxygen capacitor absorbs dissolved oxygen when the dissolved oxygen in the saturated oxygen water is at a concentration greater than saturated oxygen equilibrium and the catalytic oxygen capacitor releases dissolved oxygen when the dissolved oxygen in the saturated oxygen water is at a concentration less than the concentration in saturated oxygen equilibrium.

The saturated oxygen equilibrium can be a concentration of dissolved oxygen in saturated oxygen water that is at least 40 mg/l to 60 mg/l. In certain embodiments, when the dissolved oxygen concentration in saturated oxygen water is at least 40 mg/l to 60 mg/l, the catalytic oxygen capacitor absorbs dissolved oxygen from the saturated oxygen water until it achieves its equilibrium concentration of 40 mg/l to 60 mg/l and the catalytic oxygen capacitor releases dissolved oxygen when the dissolved oxygen in the saturated oxygen water is at a concentration of less than 40 mg/l.

The saturated oxygen equilibrium can be a concentration of dissolved oxygen in saturated oxygen water that is at least 45 mg/l to 60 mg/l. In certain embodiments, when the dissolved oxygen concentration in saturated oxygen water is at least 45 mg/l to 60 mg/l, the catalytic oxygen capacitor absorbs dissolved oxygen from the saturated oxygen water until it achieves its equilibrium concentration of 45 mg/l to 60 mg/l and the catalytic oxygen capacitor releases dissolved oxygen when the dissolved oxygen in the saturated oxygen water is at a concentration of less than 45 mg/l.

The saturated oxygen equilibrium can be a concentration of dissolved oxygen in saturated oxygen water that is at least 50 mg/l to 60 mg/l. In certain embodiments, when the dissolved oxygen concentration in saturated oxygen water is at least 50 mg/l to 60 mg/l, the catalytic oxygen capacitor absorbs dissolved oxygen from the saturated oxygen water until it achieves its equilibrium concentration of 50 mg/l to 60 mg/l and the catalytic oxygen capacitor releases dissolved oxygen when the dissolved oxygen in the saturated oxygen water is at a concentration of less than 50 mg/l.

The saturated oxygen equilibrium can be a concentration of dissolved oxygen in saturated oxygen water that is at least 55 mg/l to 60 mg/l. In certain embodiments, when the dissolved oxygen concentration in saturated oxygen water is at least 55 mg/l to 60 mg/l, the catalytic oxygen capacitor absorbs dissolved oxygen from the saturated oxygen water until it achieves its equilibrium concentration of 55 mg/l to 60 mg/l and the catalytic oxygen capacitor releases dissolved oxygen when the dissolved oxygen in the saturated oxygen water is at a concentration of less than 55 mg/l.

The saturated oxygen equilibrium can be a concentration of dissolved oxygen in saturated oxygen water that is at least 57.5 mg/l to 60 mg/l. In certain embodiments, when the dissolved oxygen concentration in saturated oxygen water is at least 57.5 mg/l to 60 mg/l, the catalytic oxygen capacitor absorbs dissolved oxygen from the saturated oxygen water until it achieves its equilibrium concentration of 57.5 mg/l to 60 mg/l and the catalytic oxygen capacitor releases dissolved oxygen when the dissolved oxygen in the saturated oxygen water is at a concentration of less than 57.5 mg/l.

The saturated oxygen equilibrium can be a concentration of dissolved oxygen in saturated oxygen water that is at least 60 mg/l to 70 mg/l. In certain embodiments, when the dissolved oxygen concentration in saturated oxygen water is at least 60 mg/l to 70 mg/l, the catalytic oxygen capacitor absorbs dissolved oxygen from the saturated oxygen water until it achieves its equilibrium concentration of 60 mg/l to 70 mg/l and the catalytic oxygen capacitor releases dissolved oxygen when the dissolved oxygen in the saturated oxygen water is at a concentration of less than 60 mg/l.

The saturated oxygen equilibrium can be a concentration of dissolved oxygen in saturated oxygen water that is at least 65 mg/l to 70 mg/l. In certain embodiments, when the dissolved oxygen concentration in saturated oxygen water is at least 65 mg/l to 70 mg/l, the catalytic oxygen capacitor absorbs dissolved oxygen from the saturated oxygen water until it achieves its equilibrium concentration of 65 mg/l to 70 mg/l and the catalytic oxygen capacitor releases dissolved oxygen when the dissolved oxygen in the saturated oxygen water is at a concentration of less than 65 mg/l.

In certain embodiments, methods disclosed herein can further comprise passing the oxygen-water mixture through a static mixer before passing the oxygen-water mixture through a pressure pump. For example, the first oxygen-water mixture discharged from the first oxygen injector or the second oxygen-water mixture discharged from the second oxygen injector can be passed through a static mixer.

In certain embodiments, the saturated oxygen water can be passed through a static mixer after passing the oxygen-water mixture through a pressure pump. In certain other embodiments, the oxygen-water mixture can be passed through a static mixer before a pressure pump and the saturated oxygen water can be passed through a static mixer after passing the oxygen-water mixture through the pressure pump.

In certain embodiments, methods disclosed herein can further comprise recirculating at least a portion of the saturated oxygen water to the pressure pump at least one time. The saturated oxygen water can be recirculated to further increase the concentration of dissolved oxygen in the saturated oxygen water.

In certain embodiments, methods disclosed herein can further comprise filling an open chamber with saturated oxygen water. The saturated oxygen water in the open chamber can comprise dissolved oxygen at a concentration of at least 40 up to 60 mg/l, at least 45 up to 60 mg/l, at least 50 up to 60 mg/l, at least 55 up to 60 mg/l, at least 57.5 up to 60 mg/l, at least 60 up to 70 mg/l, or at least 65 up to 70 mg/l. The saturated oxygen water in the open chamber can comprise dissolved oxygen at a concentration of at least 40 up to 60 mg/l, at least 45 up to 60 mg/l, at least 50 up to 60 mg/l, at least 55 up to 60 mg/l, at least 57.5 up to 60 mg/l, at least 60 up to 70 mg/l, or at least 65 up to 70 mg/l when at a pressure of 60 psi to 325 psi and a temperature of 60° F. to 140° F. The saturated oxygen water in the open chamber can comprise nanobubbles comprising a diameter of less than 1 μm.

In certain embodiments, methods disclosed herein can further comprise providing water from a water source and providing oxygen gas from an oxygen source.

In certain embodiments, methods disclosed herein can further comprise purifying the water to remove particulates, dissolved solids, ions, or a combination thereof.

Method of Increasing a Concentration of Dissolved Oxygen in Blood of a Human Subject The methods provided herein can increase a concentration of dissolved oxygen in blood of a human subject.

The methods disclosed herein can comprise producing an oxygen-water mixture as disclosed herein, using the oxygen-water mixture to produce saturated oxygen water as disclosed herein, using a catalytic oxygen capacitor to maintain dissolved oxygen in the saturated oxygen water at saturated oxygen equilibrium as disclosed herein, filling an open chamber with the saturated oxygen water as disclosed herein, inserting at least a portion of the human subject into the open chamber for a period of time, and increasing the concentration of dissolved oxygen in blood of the human subject.

In certain embodiments, the inserting at least a portion of the human subject into an open chamber for a period of time can include inserting at least a portion of the human subject into the open chamber comprising saturated oxygen water. The saturated oxygen water in the open chamber can comprise dissolved oxygen at a concentration of at least 40 up to 60 mg/l, at least 45 up to 60 mg/l, at least 50 up to 60 mg/l, at least 55 up to 60 mg/l, at least 57.5 up to 60 mg/l, at least 60 up to 70 mg/l, or at least 65 up to 70 mg/l. The at least a portion of the human subject can contact the saturated oxygen water. In certain embodiments, the at least a portion of the human subject can include an arm, a hand, an elbow, a leg, an ankle, a foot, a shoulder, a hip, a lower portion of a human body, and the entire human body except for the head. In certain embodiments, the period of time can be 1 to 60 minutes, 1 to 55 minutes, 1 to 50 minutes, 1 to 45 minutes, 1 to 40 minutes, 1 to 35 minutes, 1 to 30 minutes, 1 to 25 minutes, 1 to 20 minutes, 1 to 15 minutes, 1 to 10 minutes, 1 to 5 minutes, at least 1 minute, at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, or at least 60 minutes.

In certain embodiments, the increasing the concentration of dissolved oxygen in blood of a human subject can include increasing the concentration of dissolved oxygen in blood of a human subject by at least 0.1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25%. In certain embodiments, methods disclosed herein can further comprise measuring the concentration of dissolved oxygen in blood of the human subject during or after the period of time. The measuring can be performed using an arterial blood gas (ABG) test, a pulse oximeter, or another testing method. The measuring can also be performed using a Complete Blood Count (CBC) test, which includes hemoglobin, red blood cell count (RBC) and hematocrit. In certain embodiments, a rate of transmission of dissolved oxygen through the skin into the blood of the human subject can be 2.5 ml $O_2$/(m2·min) to 4.5 ml $O_2$/(m2·min), 2.5 ml $O_2$/(m2·min) to 4.0 ml $O_2$/(m2·min), 2.5 ml $O_2$/(m2·min) to 3.5 ml $O_2$/(m2·min), or 2.5 ml $O_2$/(m2·min) to 3.0 ml $O_2$/(m2·min).

In certain embodiments, the inserting at least a portion of the human subject into the open chamber can result in a removal of dead cells from human tissue or removal of contaminated cells from human tissue.

Systems and Methods of the Invention

Various aspects of the invention according to the present disclosure include, but are not limited to, the aspects listed in the following numbered clauses:

1. A system for producing saturated oxygen water, the system comprising:
   a first oxygen injector configured to inject oxygen gas into water to form an oxygen-water mixture;
   a pressure pump configured to increase dissolved oxygen in the oxygen-water mixture thereby producing saturated oxygen water;
   a catalytic oxygen capacitor configured to maintain dissolved oxygen in the saturated oxygen water at saturated oxygen equilibrium; and
   an open chamber configured to hold the saturated oxygen water.

2. The system of clause 1, wherein the catalytic oxygen capacitor is further configured to absorb dissolved oxygen when the dissolved oxygen in the saturated oxygen water is at a concentration greater than saturated oxygen equilibrium.

3. The system of clauses 1 or 2, wherein the catalytic oxygen capacitor is further configured to release dissolved oxygen when the dissolved oxygen in the saturated oxygen water is at a concentration less than the concentration in saturated oxygen equilibrium.

4. The system of clauses 1-3, wherein the saturated oxygen equilibrium is a concentration of dissolved oxygen in saturated oxygen water that is at least 40 mg/l to 60 mg/l.

5. The system of clause 2, wherein the catalytic oxygen capacitor is further configured to absorb dissolved oxygen when the dissolved oxygen in the saturated oxygen water is at an equilibrium concentration greater than 60 mg/l.

6. The system of clause 3, wherein the catalytic oxygen capacitor is further configured to release dissolved oxygen when the dissolved oxygen in the saturated oxygen water is at a concentration less than 40 mg/l.

7. The system of clauses 1-6, further comprising a second oxygen injector configured to inject oxygen gas into the oxygen-water mixture.

8. The system of clauses 1-7, further comprising a static mixer configured to dissolve oxygen in the oxygen-water mixture without using an external energy source.

9. The system of clause 8, wherein the static mixer is located before the pressure pump.

10. The system of clauses 1-9, wherein the first oxygen injector is located prior to the pressure pump.

11. The system of clauses 7-10, wherein the second oxygen injector is located prior to the pressure pump.

12. The system of clauses 7-11, wherein the first oxygen injector and second oxygen injector are in series.

13. The system of clauses 1-12, wherein the catalytic oxygen capacitor is located after the pressure pump.

14. The system of clauses 1-13, wherein the catalytic oxygen capacitor comprises a filter comprising absorption media.

15. The system of clause 14, wherein the absorption media is selected from a group consisting of: an activated carbon, an ion exchange resin, an organic absorbent, and an inorganic absorbent.

16. The system of clauses 1-15, wherein the saturated oxygen water comprises dissolved oxygen at a concentration of at least 40 up to 60 mg/l when at a pressure of 60 psi to 325 psi and a temperature of 60° F. to 140° F.

17. The system of clauses 1-16, wherein the saturated oxygen water comprises dissolved oxygen at a concentration of at least 50 up to 60 mg/l.

18. The system of clauses 1-16, wherein the saturated oxygen water comprises dissolved oxygen at a concentration of at least 55 up to 60 mg/l.

19. The system of clauses 1-18, wherein the saturated oxygen water comprises nanobubbles comprising a diameter of less than 1 μm.

20. The system of clauses 1-19, wherein the water is selected from a group consisting of municipal water, sea water, fresh water, aquaculture water, irrigation water, industrial water, tap water, well water, distilled water, purified water, reverse osmosis, and wastewater.

21. The system of clauses 1-20, wherein the oxygen gas comprises at least 99% oxygen.

22. The system of clauses 1-21, wherein the open chamber is selected from a group consisting of: a tank, a bathtub, and a footbath.

23. The system of clauses 1-22, wherein the first oxygen injector is further configured to receive the oxygen gas and the water.

24. The system of clauses 1-23, wherein the pressure pump is further configured to receive the oxygen-water mixture.

25. The system of clauses 1-24, wherein the catalytic oxygen capacitor is further configured to receive the saturated oxygen water.

26. The system of clauses 1-25, further comprising a water source configured to provide water to the first oxygen injector and an oxygen source configured to provide oxygen gas to the first oxygen injector.

27. The system of clauses 1-26, further comprising a purifying device configured to remove particulates, dissolved solids, ions, or a combination thereof from the water, wherein the purifying device is located before the first oxygen injector.

28. A method of producing saturated oxygen water, the method comprising:
   producing an oxygen-water mixture;
   using the oxygen-water mixture to produce saturated oxygen water; and
   using a catalytic oxygen capacitor to maintain dissolved oxygen in the saturated oxygen water at saturated oxygen equilibrium.

29. The method of clause 28, wherein the catalytic oxygen capacitor absorbs dissolved oxygen when the dissolved oxygen in the saturated oxygen water is at a concentration greater than saturated oxygen equilibrium.

30. The method of clauses 28 or 29, wherein the catalytic oxygen capacitor releases dissolved oxygen when the dissolved oxygen in the saturated oxygen water is at a concentration less than the concentration in saturated oxygen equilibrium.

31. The method of clauses 28-30, wherein the saturated oxygen equilibrium is a concentration of dissolved oxygen in saturated oxygen water that is at least 40 mg/l to 60 mg/l.

32. The method of clause 29, wherein the catalytic oxygen capacitor absorbs dissolved oxygen when the dissolved oxygen in the saturated oxygen water is at an equilibrium concentration greater than 60 mg/l.

33. The method of clause 30, wherein the catalytic oxygen capacitor releases dissolved oxygen when the dissolved oxygen in the saturated oxygen water is at a concentration less than 40 mg/l.

34. The method of clauses 28-33, wherein the producing the oxygen-water mixture comprises:
   passing water through a first oxygen injector; and
   injecting oxygen gas into the water via the first oxygen injector to produce the oxygen-water mixture.

35. The method of clauses 28-33, wherein the producing the oxygen-water mixture comprises:
  passing water through a first oxygen injector;
  injecting oxygen gas into the water via the first oxygen injector to produce a first oxygen-water mixture;
  passing the first oxygen-water mixture through a second oxygen injector to produce a second oxygen water mixture.

36. The method of clauses 28-35, wherein the using the oxygen-water mixture to produce saturated oxygen water comprises:
  passing the oxygen-water mixture through a pressure pump.

37. The method of clauses 28-36, wherein the using a catalytic oxygen capacitor to maintain dissolved oxygen in the saturated oxygen water at saturated oxygen equilibrium comprises:
  passing the saturated oxygen water through a catalytic oxygen capacitor.

38. The method of clauses 28-37, wherein the catalytic oxygen capacitor comprises a filter comprising absorption media.

39. The method of clause 38, wherein the absorption media is selected from a group consisting of: an activated carbon, an ion exchange resin, an organic absorbent, and an inorganic absorbent.

40. The method of clauses 34-39, wherein the oxygen gas injected into the water or the oxygen gas injected into the first oxygen-water mixture flows in the same direction as the water or the first oxygen-water mixture.

41. The method of clauses 36-40, further comprising:
  passing the oxygen-water mixture through a static mixer before passing the oxygen-water mixture through the pressure pump, wherein the static mixer is configured to dissolve oxygen in the oxygen-water mixture without using an external energy source.

42. The method of clauses 36-41, further comprising:
  recirculating at least a portion of the saturated oxygen water to the pressure pump at least one time.

43. The method of clauses 28-42, wherein the saturated oxygen water has a dissolved oxygen concentration of at least 50 up to 60 mg/l.

44. The method of clauses 28-42, wherein the saturated oxygen water has a dissolved oxygen concentration of at least 55 up to 60 mg/l.

45. The method of clauses 28-44, wherein the saturated oxygen water comprises nanobubbles comprising a diameter of less than 1 μm.

46. The method of clauses 28-45, wherein the water is selected from a group consisting of municipal water, sea water, fresh water, aquaculture water, irrigation water, industrial water, tap water, well water, distilled water, purified water, reverse osmosis, and wastewater.

47. The method of clauses 28-46, wherein the oxygen gas comprises at least 99% oxygen.

48. The method of clauses 28-47, further comprising:
  filling an open chamber with the saturated oxygen water.

49. The method of clause 48, wherein the open chamber is selected from a group consisting of: a tank, a bathtub, and a footbath.

50. The method of clauses 28-49, further comprising:
  providing water from a water source; and
  providing oxygen gas from an oxygen source.

51. The method of clauses 34-50, further comprising:
  purifying the water to remove particulates, dissolved solids, ions, or a combination thereof.

52. A method of increasing a concentration of dissolved oxygen in blood of a human subject, the method comprising:
  producing an oxygen-water mixture;
  using the oxygen-water mixture to produce saturated oxygen water;
  using a catalytic oxygen capacitor to maintain dissolved oxygen in the saturated oxygen water at saturated oxygen equilibrium;
  filling an open chamber with the saturated oxygen water;
  inserting at least a portion of the human subject into the open chamber for a period of time; and
  increasing the concentration of dissolved oxygen in blood of the human subject.

53. The method of clause 52, further comprising:
  measuring the concentration of dissolved oxygen in blood of the human subject during or after the period of time.

54. The method of clause 53, wherein the measuring is performed using one or more of an arterial blood gas (ABG) test and a complete blood count (CBC) test.

55. The method of clause 53, wherein the rate of transmission of dissolved oxygen through the skin into the blood of the human subject is 2.5 ml $O_2$/(m2·min) to 4.5 ml $O_2$/(m2·min).

56. The method of clauses 52-55, wherein the period of time is 1 to 60 minutes.

57. The method of clauses 52-56, wherein the at least a portion of the human subject is selected from a group consisting of: an arm, a hand, an elbow, a leg, an ankle, a foot, a shoulder, a hip, a lower portion of a human body, and the entire human body except for the head.

58. The method of clauses 52-57, wherein the inserting at least a portion of the human subject into the open chamber results in a removal of dead cells or contaminated cells from human tissue.

59. The method of clauses 52-58, wherein the catalytic oxygen capacitor absorbs dissolved oxygen when the dissolved oxygen in the saturated oxygen water is at a concentration greater than saturated oxygen equilibrium.

60. The method of clauses 52-59, wherein the catalytic oxygen capacitor releases dissolved oxygen when the dissolved oxygen in the saturated oxygen water is at a concentration less than the concentration in saturated oxygen equilibrium.

61. The method of clauses 52-60, wherein the saturated oxygen equilibrium is a concentration of dissolved oxygen in saturated oxygen water that is at least 40 mg/l to 60 mg/l.

62. The method of clause 59, wherein the catalytic oxygen capacitor absorbs dissolved oxygen when the dissolved oxygen in the saturated oxygen water is at an equilibrium concentration greater than 60 mg/l.

63. The method of clause 60, wherein the catalytic oxygen capacitor releases dissolved oxygen when the dissolved oxygen in the saturated oxygen water is at a concentration less than 40 mg/l.

64. The method of clauses 52-63, wherein the producing the oxygen-water mixture comprises:
  passing water through a first oxygen injector; and
  injecting oxygen gas into the water via the first oxygen injector to produce the oxygen-water mixture.

65. The method of clauses 52-63, wherein the producing the oxygen-water mixture comprises:
  passing water through a first oxygen injector;
  injecting oxygen gas into the water via the first oxygen injector to produce a first oxygen-water mixture;
  passing the first oxygen-water mixture through a second oxygen injector to produce a second oxygen water mixture.

66. The method of clauses 52-65, wherein the using the oxygen-water mixture to produce saturated oxygen water comprises:
passing the oxygen-water mixture through a pressure pump.

67. The method of clauses 52-66, wherein the using a catalytic oxygen capacitor to maintain dissolved oxygen in the saturated oxygen water at saturated oxygen equilibrium comprises:
passing the saturated oxygen water through a catalytic oxygen capacitor.

68. The method of clauses 52-67, wherein the catalytic oxygen capacitor comprises a filter comprising absorption media.

69. The method of clause 68, wherein the absorption media is selected from a group consisting of: an activated carbon, an ion exchange resin, an organic absorbent, and an inorganic absorbent.

70. The method of clauses 64-69, wherein the oxygen gas injected into the water or the oxygen gas injected into the first oxygen-water mixture flows in the same direction as the water or the first oxygen-water mixture.

71. The method of clauses 66-70, further comprising:
passing the oxygen-water mixture through a static mixer before passing the oxygen-water mixture through the pressure pump, wherein the static mixer is configured to dissolve oxygen in the oxygen-water mixture without using an external energy source.

72. The method of clauses 66-71, further comprising:
recirculating at least a portion of the saturated oxygen water to the pressure pump at least one time.

73. The method of clauses 52-72, wherein the saturated oxygen water has a dissolved oxygen concentration of at least 50 up to 60 mg/l.

74. The method of clauses 52-72, wherein the saturated oxygen water has a dissolved oxygen concentration of at least 55 up to 60 mg/l.

75. The method of clauses 52-74, wherein the saturated oxygen water comprises nanobubbles comprising a diameter of less than 1 μm.

76. The method of clauses 52-75, wherein the water is selected from a group consisting of municipal water, sea water, fresh water, aquaculture water, irrigation water, industrial water, tap water, well water, distilled water, purified water, reverse osmosis, and wastewater.

77. The method of clauses 52-76, wherein the oxygen gas comprises at least 99% oxygen.

78. The method of clauses 52-77, further comprising:
filling an open chamber with the saturated oxygen water.

79. The method of clause 78, wherein the open chamber is selected from a group consisting of: a tank, a bathtub, and a footbath.

80. The method of clauses 52-79, further comprising:
providing water from a water source; and
providing oxygen gas from an oxygen source.

81. The method of clauses 52-80, further comprising:
purifying the water to remove particulates, dissolved solids, ions, or a combination thereof.

Definitions and General Terminology

In addition to the definitions previously set forth herein, the following definitions are relevant to the present disclosure:

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

Any patent, publication, or other disclosure material identified herein is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The details of one or more aspects of the present disclosure are set forth in the accompanying examples below. Although any materials and methods similar or equivalent to those described herein can be used in the practice or testing of the present disclosure, specific examples of the materials and methods contemplated are now described. Other features, objects and advantages of the present disclosure will be apparent from the description. In the description examples, the singular forms also include the plural unless the context clearly dictates otherwise. Unless defined otherwise, all technical and scientific terms used herein have the same meaning as commonly understood by one of ordinary skill in the art to which this present disclosure belongs. In the case of conflict, the present description will control.

EXAMPLES

The present disclosure will be more fully understood by reference to the following examples, which provide illustrative, non-limiting aspects of the invention.

The examples describe methods of producing saturated oxygen water. The described methods represent a novel strategy for producing saturated oxygen water and increasing concentration of dissolved oxygen in blood of a human subject, as described and illustrated herein.

Example 1—Producing Saturated Oxygen Water

Saturated oxygen water was prepared using a system comprising a first oxygen injector (102), a pressure pump (112), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) was opened for 99% oxygen gas to flow into the system from a compressed oxygen source to the first oxygen injector (102). A gas regulator (104) located between the oxygen source and the first oxygen injector (102) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce an oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The oxygen-water mixture then entered a suction side of the pressure pump (112). The pressure pump (112) increased dissolved oxygen in the oxygen-water mixture to produce saturated oxygen water.

The saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 50 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 50 mg/l.

The saturated oxygen water at an equilibrium concentration of at least 50 up to 60 mg/l was discharged from the catalytic oxygen capacitor (118) and entered an oxygen bubble nozzle before flowing into the open chamber (124).

Example 2—Producing Saturated Oxygen Water

Saturated oxygen water was prepared using a system comprising a first oxygen injector (102), a second oxygen injector (108), a pressure pump (112), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) and the second oxygen injector (108) was opened for 99% oxygen gas to flow into the system from a compressed oxygen source to the first oxygen injector (102) and the second oxygen injector (108). A gas regulator (104) located between the oxygen source and the first oxygen injector (102) and the second oxygen injector (108) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce a first oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The first oxygen-water mixture then flowed into the second oxygen injector (108) where oxygen gas was injected into the first oxygen-water mixture to produce a second oxygen-water mixture. The oxygen gas was injected in a downward position configuration or downward flow, such that the first oxygen-water mixture created a negative pressure, pulling the oxygen gas into the first oxygen-water mixture and thereby increasing the dissolving of the oxygen gas.

The second oxygen-water mixture then entered a suction side of the pressure pump (112). The pressure pump (112) increased dissolved oxygen in the second oxygen-water mixture to produce saturated oxygen water.

The saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 50 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 50 mg/l.

The saturated oxygen water at an equilibrium concentration of at least 50 up to 60 mg/l was discharged from the catalytic oxygen capacitor (118) and entered an oxygen bubble nozzle before flowing into the open chamber (124).

Example 3—Producing Saturated Oxygen Water

Saturated oxygen water was prepared using a system comprising a first oxygen injector (102), a pressure pump (112), a recycle loop (114), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) was opened for 99% oxygen gas to flow into the system from a compressed oxygen source to the first oxygen injector (102). A gas regulator (104) located between the oxygen source and the first oxygen injector (102) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce an oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The oxygen-water mixture then entered a suction side of the pressure pump (112). The pressure pump (112) increased dissolved oxygen in the oxygen-water mixture to produce saturated oxygen water.

At least a portion of the saturated oxygen water that was discharged from the pressure pump (112) entered the recycle loop (114). The recycle loop returned a portion of the saturated oxygen water to the suction side of the pressure pump (112) to further increase the concentration of dissolved oxygen in the saturated oxygen water.

The remaining portion of the saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 50 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 50 mg/l.

The saturated oxygen water at an equilibrium concentration of at least 50 up to 60 mg/l was discharged from the catalytic oxygen capacitor (118) and entered an oxygen bubble nozzle before flowing into the open chamber (124).

Example 4—Producing Saturated Oxygen Water

Saturated oxygen water was prepared using a system comprising a first oxygen injector (102), a second oxygen injector (108), a pressure pump (112), a recycle loop (114), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) and the second oxygen injector (108) was opened for 99% oxygen gas to flow into the system from a compressed oxygen source to the first oxygen injector (102) and the second oxygen injector (108). A gas regulator (104) located between the oxygen source and the first oxygen injector (102) and the second oxygen injector (108) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce a first oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The first oxygen-water mixture then flowed into the second oxygen injector (108) where oxygen gas was injected into the first oxygen-water mixture to produce a second oxygen-water mixture. The oxygen gas was injected in a downward position configuration or downward flow, such that the first oxygen-water mixture created a negative pressure, pulling the oxygen gas into the first oxygen-water mixture and thereby increasing the dissolving of the oxygen gas.

The second oxygen-water mixture then entered a suction side of the pressure pump (112). The pressure pump (112) increased dissolved oxygen in the second oxygen-water mixture to produce saturated oxygen water.

At least a portion of the saturated oxygen water that was discharged from the pressure pump (112) entered the recycle loop (114). The recycle loop returned a portion of the saturated oxygen water to the suction side of the pressure pump (112) to further increase the concentration of dissolved oxygen in the saturated oxygen water.

The remaining portion of the saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 50 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 50 mg/l.

The saturated oxygen water at an equilibrium concentration of at least 50 up to 60 mg/l was discharged from the catalytic oxygen capacitor (118) and entered an oxygen bubble nozzle before flowing into the open chamber (124).

Example 5—Producing Saturated Oxygen Water

Saturated oxygen water was prepared using a system comprising a first oxygen injector (102), a static mixer (110), a pressure pump (112), a catalytic oxygen capacitor (118), and an open chamber (124).

An oxygen-water mixture was prepared as described in Example 1. Before entering the pressure pump (112), the oxygen-water mixture was passed through the static mixer (110) to further increase the dissolved oxygen saturation in the oxygen-water mixture. After the oxygen-water mixture was discharged from the static mixer (110), it entered a suction side of the pressure pump (112). The pressure pump (112) increased dissolved oxygen in the oxygen-water mixture to produce saturated oxygen water. After discharged from the pressure pump (112), the saturated oxygen water was passed through the system as described in Example 1 until it entered the open chamber (124).

Example 6—Producing Saturated Oxygen Water

Saturated oxygen water was prepared using a system comprising a first oxygen injector (102), a second oxygen injector (108), a static mixer (110), a pressure pump (112), a catalytic oxygen capacitor (118), and an open chamber (124).

A first oxygen-water mixture and second oxygen-water mixture were prepared as described in Example 2. Before entering the pressure pump (112), the second oxygen-water mixture was passed through a static mixer (110) to further increase the dissolved oxygen saturation in the second oxygen-water mixture. After the second oxygen-water mixture was discharged from the static mixer (110), it entered a suction side of the pressure pump (112). The pressure pump (112) increased dissolved oxygen in the second oxygen-water mixture to produce saturated oxygen water. After discharged from the pressure pump (112), the saturated oxygen water was passed through the system as described in Example 2 until it entered the open chamber (124).

Example 7—Producing Saturated Oxygen Water

Saturated oxygen water was prepared using a system comprising a first oxygen injector (102), a static mixer (110), a pressure pump (112), a recycle loop (114), a catalytic oxygen capacitor (118), and an open chamber (124).

An oxygen-water mixture was prepared as described in Example 3. Before entering the pressure pump (112), the oxygen-water mixture was passed through the static mixer (110) to further increase the dissolved oxygen saturation in the oxygen-water mixture. After the oxygen-water mixture was discharged from the static mixer (110), it entered a suction side of the pressure pump (112). The pressure pump (112) increased dissolved oxygen in the oxygen-water mixture to produce saturated oxygen water. After discharged from the pressure pump (112), the saturated oxygen water was passed through the system as described in Example 3 until it entered the open chamber (124).

Example 8—Producing Saturated Oxygen Water

Saturated oxygen water was prepared using a system comprising a first oxygen injector (102), a second oxygen injector (108), a static mixer (110), a recycle loop (114), a pressure pump (112), a catalytic oxygen capacitor (118), and an open chamber (124).

A first oxygen-water mixture and second oxygen-water mixture was prepared as described in Example 4. Before entering the pressure pump (112), the second oxygen-water mixture was passed through a static mixer (110) to further increase the dissolved oxygen saturation in the second oxygen-water mixture. After the second oxygen-water mixture was discharged from the static mixer (110), it entered a suction side of the pressure pump (112). The pressure pump (112) increased dissolved oxygen in the second oxygen-water mixture to produce saturated oxygen water. After discharged from the pressure pump (112), the saturated oxygen water was passed through the system described in Example 4 until it entered the open chamber (124).

Example 9—Measuring Dissolved Oxygen in Blood of a Human Subject

Saturated oxygen water was prepared as described in Example 8. An open chamber was filled with the saturated oxygen water.

A human subject's entire body except for the subject's head was inserted into the open chamber filled with saturated oxygen water for a treatment period of 33 minutes. Using a finger pulse oxymeter, a concentration of dissolved oxygen in blood of the human subject was measured before the human subject entered the open chamber ($t_0$=0). The concentration of dissolved oxygen in blood of the human subject was 97% at to. The human subject's pulse rate (bpm) was 40. After a treatment period of 33 minutes, the concentration of dissolved oxygen in blood of the human subject was 99% and pulse rate was 39. This result showed a 2% increase in the concentration of dissolved oxygen in blood of a human subject after one treatment of 33 minutes.

Example 10—Measuring Dissolved Oxygen in Blood of a Human Subject

Saturated oxygen water was prepared as described in Example 8. An open chamber was filled with the saturated oxygen water.

A human subject's entire body except for the subject's head was inserted into the open chamber filled with saturated oxygen water for a treatment period of 33 minutes. Using a finger pulse oxymeter, a concentration of dissolved oxygen in blood of the human subject was measured before the human subject entered the open chamber ($t_0$=0). The concentration of dissolved oxygen in blood of the human subject was 97% at to. The human subject's pulse rate (bpm) was 40. After a treatment period of 33 minutes, the concentration of dissolved oxygen in blood of the human subject was 99% and pulse rate was 39.

After 12 hours, the human subject's entire body except for the subject's head was again inserted into the open chamber filled with saturated oxygen water for a treatment period of 30 minutes. Using a finger pulse oxymeter, a concentration of dissolved oxygen in blood of the human subject was measured at 100% 12 hours after the 30 minute treatment. The human subject's pulse rate (bpm) was 52. This result showed a 3% increase in the concentration of dissolved oxygen in blood of a human subject after two treatments.

Example 11—Measuring Dissolved Oxygen in Blood of a Human Subject

Saturated oxygen water will be prepared as described in any one of Examples 1 to 8. An open chamber will be filled with the saturated oxygen water.

A human subject's entire body except for the subject's head will be inserted into the open chamber filled with saturated oxygen water for a treatment period of 1 to 60 minutes. Using an arterial blood gas (ABG) test or another testing method, a concentration of dissolved oxygen in blood of the human subject will be measured before the human subject enters the open chamber ($t_0$=0), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 12—Measuring Dissolved Oxygen in Blood of a Human Subject

Saturated oxygen water will be prepared as described in any one of Examples 1 to 8. An open chamber will be filled with the saturated oxygen water.

A human subject's lower body from the waist down will be inserted into the open chamber filled with saturated oxygen water for a treatment period of 1 to 60 minutes. Using an ABG test or another testing method, a concentration of dissolved oxygen in blood of the human subject will be measured before the lower body of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 13—Measuring Dissolved Oxygen in Blood of a Human Subject

Saturated oxygen water will be prepared as described in any one of Examples 1 to 8. An open chamber will be filled with the saturated oxygen water.

A human subject's lower body to submerge the hip will be inserted into the open chamber filled with saturated oxygen water for a treatment period of 1 to 60 minutes. Using an ABG test or another testing method, a concentration of dissolved oxygen in blood of the human subject will be measured before the hip of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 14—Measuring Dissolved Oxygen in Blood of a Human Subject

Saturated oxygen water will be prepared as described in any one of Examples 1 to 8. An open chamber will be filled with the saturated oxygen water.

A human subject's leg will be inserted into the open chamber filled with saturated oxygen water for a treatment period of 1 to 60 minutes. Using an ABG test or another testing method, a concentration of dissolved oxygen in blood of the human subject will be measured before the leg of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 15—Measuring Dissolved Oxygen in Blood of a Human Subject

Saturated oxygen water will be prepared as described in any one of Examples 1 to 8. An open chamber will be filled with the saturated oxygen water.

A human subject's ankle will be inserted into the open chamber filled with saturated oxygen water for a treatment period of 1 to 60 minutes. Using an ABG test or another testing method, a concentration of dissolved oxygen in blood of the human subject will be measured before the ankle of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 16—Measuring Dissolved Oxygen in Blood of a Human Subject

Saturated oxygen water will be prepared as described in any one of Examples 1 to 8. An open chamber will be filled with the saturated oxygen water.

A human subject's foot will be inserted into the open chamber filled with saturated oxygen water for a treatment period of 1 to 60 minutes. Using an ABG test or another testing method, a concentration of dissolved oxygen in blood of the human subject will be measured before the foot of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 17—Measuring Dissolved Oxygen in Blood of a Human Subject

Saturated oxygen water will be prepared as described in any one of Examples 1 to 8. An open chamber will be filled with the saturated oxygen water.

A human subject's arm will be inserted into the open chamber filled with saturated oxygen water for a treatment period of 1 to 60 minutes. Using an ABG test or another testing method, a concentration of dissolved oxygen in blood of the human subject will be measured before the arm of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 18—Measuring Dissolved Oxygen in Blood of a Human Subject

Saturated oxygen water will be prepared as described in any one of Examples 1 to 8. An open chamber will be filled with the saturated oxygen water.

A human subject's shoulder will be inserted into the open chamber filled with saturated oxygen water for a treatment period of 1 to 60 minutes. Using an ABG test or another testing method, a concentration of dissolved oxygen in blood of the human subject will be measured before the shoulder of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 19—Measuring Dissolved Oxygen in Blood of a Human Subject

Saturated oxygen water will be prepared as described in any one of Examples 1 to 8. An open chamber will be filled with the saturated oxygen water.

A human subject's elbow will be inserted into the open chamber filled with saturated oxygen water for a treatment period of 1 to 60 minutes. Using an ABG test or another testing method, a concentration of dissolved oxygen in blood of the human subject will be measured before the elbow of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 20—Measuring Dissolved Oxygen in Blood of a Human Subject

Saturated oxygen water will be prepared as described in any one of Examples 1 to 8. An open chamber will be filled with the saturated oxygen water.

A human subject's hand will be inserted into the open chamber filled with saturated oxygen water for a treatment period of 1 to 60 minutes. Using an ABG test or another testing method, a concentration of dissolved oxygen in blood of the human subject will be measured before the hand of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 21—Producing Saturated Oxygen Water

Saturated oxygen water was prepared using a system comprising a first oxygen injector (102), a pressure pump (112), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) was opened for 99% oxygen gas to flow into the system from a compressed oxygen source to the first oxygen injector (102). A gas regulator (104) located between the oxygen source and the first oxygen injector (102) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce an oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The oxygen-water mixture then entered a suction side of the pressure pump (112). The pressure pump (112) increased dissolved oxygen in the oxygen-water mixture to produce saturated oxygen water.

The saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 40 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 40 mg/l.

The saturated oxygen water at an equilibrium concentration of at least 40 up to 60 mg/l was discharged from the catalytic oxygen capacitor (118) and entered an oxygen bubble nozzle before flowing into the open chamber (124).

Example 22—Producing Saturated Oxygen Water

Saturated oxygen water was prepared using a system comprising a first oxygen injector (102), a second oxygen injector (108), a pressure pump (112), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) and the second oxygen injector (108) was opened for 99% oxygen gas to flow into the system from a compressed oxygen source to the first oxygen injector (102) and the second oxygen injector (108). A gas regulator (104) located between the oxygen source and the first oxygen injector (102) and the second oxygen injector (108) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce a first oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The first oxygen-water mixture then flowed into the second oxygen injector (108) where oxygen gas was injected into the first oxygen-water mixture to produce a second oxygen-water mixture. The oxygen gas was injected in a downward position configuration or downward flow, such that the first oxygen-water mixture created a negative pressure, pulling the oxygen gas into the first oxygen-water mixture and thereby increasing the dissolving of the oxygen gas.

The second oxygen-water mixture then entered a suction side of the pressure pump (112). The pressure pump (112) increased dissolved oxygen in the second oxygen-water mixture to produce saturated oxygen water.

The saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 40 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 40 mg/l.

The saturated oxygen water at an equilibrium concentration of at least 40 up to 60 mg/l was discharged from the catalytic oxygen capacitor (118) and entered an oxygen bubble nozzle before flowing into the open chamber (124).

Example 23—Producing Saturated Oxygen Water

Saturated oxygen water was prepared using a system comprising a first oxygen injector (102), a pressure pump (112), a recycle loop (114), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) was opened for 99% oxygen gas to flow into the system from a compressed oxygen source to the first oxygen injector (102). A gas regulator (104) located between the oxygen source and the first oxygen injector (102) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce an oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The oxygen-water mixture then entered a suction side of the pressure pump (112). The pressure pump (112) increased dissolved oxygen in the oxygen-water mixture to produce saturated oxygen water.

At least a portion of the saturated oxygen water that was discharged from the pressure pump (112) entered the recycle loop (114). The recycle loop returned a portion of the saturated oxygen water to the suction side of the pressure pump (112) to further increase the concentration of dissolved oxygen in the saturated oxygen water.

The remaining portion of the saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 40 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 40 mg/l.

The saturated oxygen water at an equilibrium concentration of at least 40 up to 60 mg/l was discharged from the catalytic oxygen capacitor (118) and entered an oxygen bubble nozzle before flowing into the open chamber (124).

Example 24—Producing Saturated Oxygen Water

Saturated oxygen water was prepared using a system comprising a first oxygen injector (102), a second oxygen injector (108), a pressure pump (112), a recycle loop (114), a catalytic oxygen capacitor (118), and an open chamber (124).

A water valve (100) located between the water source and the first oxygen injector (102) was opened for water to flow into the system from the water source to the first oxygen injector (102). Water from the water source had approximately 9-10 mg/l of dissolved oxygen. Temperature of the water was controlled between 65-112° F. using a hot water heater. A water inlet valve (126) located between the water source and first oxygen injector (102) controlled the water flow rate at 1-10 GPM and maintained a desired inlet water pressure of 80-120 psi.

A compressed oxygen shut off valve (128) located between the oxygen source and the first oxygen injector (102) and the second oxygen injector (108) was opened for 99% oxygen gas to flow into the system from a compressed oxygen source to the first oxygen injector (102) and the second oxygen injector (108). A gas regulator (104) located between the oxygen source and the first oxygen injector (102) and the second oxygen injector (108) controlled the oxygen pressure between 20 to 250 psi. A gas rotameter (106) located between the oxygen source and the first oxygen injector (102) measured the volume metric flow rate of oxygen and maintained it between 0.1-1000 ml/min.

Water flowed into the first oxygen injector (102) where oxygen gas was injected into the water stream to produce a first oxygen-water mixture. The oxygen gas was injected in a downward position configuration or downward flow, such that the oxygen water stream created a negative pressure, pulling the oxygen gas into the water stream and thereby increasing the dissolving of the oxygen gas.

The first oxygen-water mixture then flowed into the second oxygen injector (108) where oxygen gas was injected into the first oxygen-water mixture to produce a second oxygen-water mixture. The oxygen gas was injected in a downward position configuration or downward flow, such that the first oxygen-water mixture created a negative pressure, pulling the oxygen gas into the first oxygen-water mixture and thereby increasing the dissolving of the oxygen gas.

The second oxygen-water mixture then entered a suction side of the pressure pump (112). The pressure pump (112) increased dissolved oxygen in the second oxygen-water mixture to produce saturated oxygen water.

At least a portion of the saturated oxygen water that was discharged from the pressure pump (112) entered the recycle loop (114). The recycle loop returned a portion of the saturated oxygen water to the suction side of the pressure pump (112) to further increase the concentration of dissolved oxygen in the saturated oxygen water.

The remaining portion of the saturated oxygen water that was discharged from the pressure pump (112) entered the catalytic oxygen capacitor (118). The catalytic oxygen capacitor (118) maintained dissolved oxygen in the saturated oxygen water at a saturated oxygen equilibrium of at least 40 mg/l to 60 mg/l by absorbing dissolved oxygen when the dissolved oxygen in the saturated oxygen water was at an equilibrium concentration greater than 60 mg/l and releasing dissolved oxygen when the dissolved oxygen in the saturated oxygen water was at a concentration less than 40 mg/l.

The saturated oxygen water at an equilibrium concentration of at least 40 up to 60 mg/l was discharged from the catalytic oxygen capacitor (118) and entered an oxygen bubble nozzle before flowing into the open chamber (124).

Example 25—Producing Saturated Oxygen Water

Saturated oxygen water was prepared using a system comprising a first oxygen injector (102), a static mixer (110), a pressure pump (112), a catalytic oxygen capacitor (118), and an open chamber (124).

An oxygen-water mixture was prepared as described in Example 21. Before entering the pressure pump (112), the oxygen-water mixture was passed through the static mixer (110) to further increase the dissolved oxygen saturation in the oxygen-water mixture. After the oxygen-water mixture was discharged from the static mixer (110), it entered a suction side of the pressure pump (112). The pressure pump (112) increased dissolved oxygen in the oxygen-water mixture to produce saturated oxygen water. After discharged from the pressure pump (112), the saturated oxygen water was passed through the system as described in Example 21 until it entered the open chamber (124).

Example 26—Producing Saturated Oxygen Water

Saturated oxygen water was prepared using a system comprising a first oxygen injector (102), a second oxygen injector (108), a static mixer (110), a pressure pump (112), a catalytic oxygen capacitor (118), and an open chamber (124).

A first oxygen-water mixture and second oxygen-water mixture were prepared as described in Example 22. Before entering the pressure pump (112), the second oxygen-water mixture was passed through a static mixer (110) to further increase the dissolved oxygen saturation in the second oxygen-water mixture. After the second oxygen-water mixture was discharged from the static mixer (110), it entered a suction side of the pressure pump (112). The pressure pump (112) increased dissolved oxygen in the second oxygen-water mixture to produce saturated oxygen water. After discharged from the pressure pump (112), the saturated oxygen water was passed through the system as described in Example 22 until it entered the open chamber (124).

Example 27—Producing Saturated Oxygen Water

Saturated oxygen water was prepared using a system comprising a first oxygen injector (102), a static mixer (110), a pressure pump (112), a recycle loop (114), a catalytic oxygen capacitor (118), and an open chamber (124).

An oxygen-water mixture was prepared as described in Example 23. Before entering the pressure pump (112), the oxygen-water mixture was passed through the static mixer (110) to further increase the dissolved oxygen saturation in the oxygen-water mixture. After the oxygen-water mixture was discharged from the static mixer (110), it entered a suction side of the pressure pump (112). The pressure pump (112) increased dissolved oxygen in the oxygen-water mixture to produce saturated oxygen water. After discharged from the pressure pump (112), the saturated oxygen water was passed through the system as described in Example 23 until it entered the open chamber (124).

Example 28—Producing Saturated Oxygen Water

Saturated oxygen water was prepared using a system comprising a first oxygen injector (102), a second oxygen injector (108), a static mixer (110), a recycle loop (114), a pressure pump (112), a catalytic oxygen capacitor (118), and an open chamber (124).

A first oxygen-water mixture and second oxygen-water mixture was prepared as described in Example 24. Before entering the pressure pump (112), the second oxygen-water mixture was passed through a static mixer (110) to further increase the dissolved oxygen saturation in the second oxygen-water mixture. After the second oxygen-water mixture was discharged from the static mixer (110), it entered a suction side of the pressure pump (112). The pressure pump (112) increased dissolved oxygen in the second oxygen-water mixture to produce saturated oxygen water. After discharged from the pressure pump (112), the saturated oxygen water was passed through the system as described in Example 24 until it entered the open chamber (124).

Example 29—Measuring Dissolved Oxygen in Blood of a Human Subject

Saturated oxygen water will be prepared as described in any one of Examples 21 to 28. An open chamber will be filled with the saturated oxygen water.

A human subject's entire body except for the subject's head will be inserted into the open chamber filled with saturated oxygen water for a treatment period of 1 to 60 minutes. Using an arterial blood gas (ABG) test, Complete Blood Count (CBC) test, or another testing method, a concentration of dissolved oxygen in blood of the human subject will be measured before the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 30—Measuring Dissolved Oxygen in Blood of a Human Subject

Saturated oxygen water will be prepared as described in any one of Examples 21 to 28. An open chamber will be filled with the saturated oxygen water.

A human subject's lower body from the waist down will be inserted into the open chamber filled with saturated oxygen water for a treatment period of 1 to 60 minutes. Using an ABG test, CBC test, or another testing method, a concentration of dissolved oxygen in blood of the human subject will be measured before the lower body of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 31—Measuring Dissolved Oxygen in Blood of a Human Subject

Saturated oxygen water will be prepared as described in any one of Examples 21 to 28. An open chamber will be filled with the saturated oxygen water.

A human subject's lower body to submerge the hip will be inserted into the open chamber filled with saturated oxygen water for a treatment period of 1 to 60 minutes. Using an ABG test, CBC test, or another testing method, a concentration of dissolved oxygen in blood of the human subject will be measured before the hip of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 32—Measuring Dissolved Oxygen in Blood of a Human Subject

Saturated oxygen water will be prepared as described in any one of Examples 21 to 28. An open chamber will be filled with the saturated oxygen water.

A human subject's leg will be inserted into the open chamber filled with saturated oxygen water for a treatment period of 1 to 60 minutes. Using an ABG test, CBC test, or another testing method, a concentration of dissolved oxygen in blood of the human subject will be measured before the leg of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 33—Measuring Dissolved Oxygen in Blood of a Human Subject

Saturated oxygen water will be prepared as described in any one of Examples 21 to 28. An open chamber will be filled with the saturated oxygen water.

A human subject's ankle will be inserted into the open chamber filled with saturated oxygen water for a treatment period of 1 to 60 minutes. Using an ABG test, CBC test, or another testing method, a concentration of dissolved oxygen in blood of the human subject will be measured before the ankle of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 34—Measuring Dissolved Oxygen in Blood of a Human Subject

Saturated oxygen water will be prepared as described in any one of Examples 21 to 28. An open chamber will be filled with the saturated oxygen water.

A human subject's foot will be inserted into the open chamber filled with saturated oxygen water for a treatment period of 1 to 60 minutes. Using an ABG test, CBC test, or another testing method, a concentration of dissolved oxygen in blood of the human subject will be measured before the foot of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 35—Measuring Dissolved Oxygen in Blood of a Human Subject

Saturated oxygen water will be prepared as described in any one of Examples 21 to 28. An open chamber will be filled with the saturated oxygen water.

A human subject's arm will be inserted into the open chamber filled with saturated oxygen water for a treatment period of 1 to 60 minutes. Using an ABG test, CBC test, or another testing method, a concentration of dissolved oxygen in blood of the human subject will be measured before the arm of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 36—Measuring Dissolved Oxygen in Blood of a Human Subject

Saturated oxygen water will be prepared as described in any one of Examples 21 to 28. An open chamber will be filled with the saturated oxygen water.

A human subject's shoulder will be inserted into the open chamber filled with saturated oxygen water for a treatment period of 1 to 60 minutes. Using an ABG test, CBC test, or another testing method, a concentration of dissolved oxygen in blood of the human subject will be measured before the shoulder of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 37—Measuring Dissolved Oxygen in Blood of a Human Subject

Saturated oxygen water will be prepared as described in any one of Examples 21 to 28. An open chamber will be filled with the saturated oxygen water.

A human subject's elbow will be inserted into the open chamber filled with saturated oxygen water for a treatment period of 1 to 60 minutes. Using an ABG test, CBC test, or another testing method, a concentration of dissolved oxygen in blood of the human subject will be measured before the elbow of the human subject enters the open chamber ($t_0=0$), during the treatment period, and after the treatment period. The rate of transmission of dissolved oxygen through the skin into the blood of the human subject will be 2.5 ml $O_2$/(m2·min) to 4.5 ml $O_2$/(m2·min). This will result in a 1-25% increase in the concentration of dissolved oxygen in blood of a human subject after 1 or more treatments.

Example 38—Measuring Dissolved Oxygen in Blood of a Human Subject

Saturated oxygen water will be prepared as described in any one of Examples 21 to 28. An open chamber will be filled with the saturated oxygen water.

A human subject's hand will be inserted into the open chamber filled with saturated oxygen water for a treatment period of 1 to 60 minutes. Using an ABG test, CBC test, or another testing method, a concentration of dissolved oxygen in blood of the human subject will be measured before the hand of the human subject enters the open chamber ($t_0=0$), during the treatment period, and after the treatment period. The rate of transmission of dissolved oxygen through the skin into the blood of the human subject will be 2.5 ml $O_2/(m2 \cdot min)$ to 4.5 ml $O_2/(m2 \cdot min)$. This will result in a 1-25% increase in the concentration of dissolved oxygen in blood of a human subject after 1 or more treatments.

Example 39—Measuring Dissolved Oxygen in Blood of a Human Subject

Saturated oxygen water was prepared as described in Example 28. An open chamber was filled with the saturated oxygen water.

A human subject's lower body area, which included the feet, ankles, legs and hip was inserted into the open chamber filled with saturated oxygen water for a treatment period of 33 minutes. Using a finger pulse oxymeter, a concentration of dissolved oxygen in blood of the human subject was measured before the human subject entered the open chamber ($t_0=0$). The concentration of dissolved oxygen in blood of the human subject was 97% at to. The human subject's pulse rate (bpm) was 40. After a treatment period of 33 minutes, the concentration of dissolved oxygen in blood of the human subject was 99% and pulse rate was 39. This result showed a 2% increase in the concentration of dissolved oxygen in blood of a human subject after one treatment of 33 minutes.

Example 40—Measuring Dissolved Oxygen in Blood of a Human Subject

Saturated oxygen water was prepared as described in Example 28. An open chamber was filled with the saturated oxygen water.

A human subject's lower body area, which included the feet, ankles, legs and hip was inserted into the open chamber filled with saturated oxygen water for a treatment period of 33 minutes. Using a finger pulse oxymeter, a concentration of dissolved oxygen in blood of the human subject was measured before the human subject entered the open chamber ($t_0=0$). The concentration of dissolved oxygen in blood of the human subject was 97% at to. The human subject's pulse rate (bpm) was 40. After a treatment period of 33 minutes, the concentration of dissolved oxygen in blood of the human subject was 99% and pulse rate was 39.

After 12 hours, the human subject's lower body area was inserted into the open chamber filled with saturated oxygen water for a second new treatment period of 30 minutes. Using a finger pulse oxymeter, the concentration of dissolved oxygen in blood of the human subject was measured at 100% after the 30 minute treatment. The human subject's pulse rate (bpm) was 52. This result showed a 3% increase in the concentration of dissolved oxygen in blood of the human subject after two treatments.

Example 41—Measuring Dissolved Oxygen in Blood of a Human Subject

Saturated oxygen water was prepared as described in Example 28. An open chamber was filled with the saturated oxygen water.

A human subject's lower body area, which included the feet, ankles, legs and hip was inserted into the open chamber filled with saturated oxygen water for a treatment period of 30 minutes. Before the human subject entered the open chamber for the first therapy session, a Complete Blood Count (CBC) test which included: red blood cell count (RBC), hemoglobin (HgB), and hematocrit (HCT) was conducted to quantify the concentration of dissolved oxygen in blood of the human subject at ($t_0=0$). The initial CBC test results for RBC, HgB, and HCT were $5.67 \times 10^{12}/L$, 16.0 g/dl, and 50.1% respectively.

The human subject had a total of nine therapy sessions over a 12 week period. After the ninth therapy session, the CBC test results which included: RBC, HgB, and HCT were $6.34 \times 10^{12}/L$, 18.3 g/dl, and 57.0% respectively. These results revealed that all three blood factors increased to very high levels and exceeded the maximum control levels. The RBC, HgB and HCT levels all increased over the initial base-line levels by 11.8%, 14.3% and 13.8% respectively (Table 1). Also, after 90 days, the subject had retained these high RBC, HgB, and HCT levels (data not shown).

The rate of transmission of dissolved oxygen through the skin into the blood of the human subject was between 2.5 ml $O_2/(m2 \cdot min)$ to 4.5 ml $O_2/(m2 \cdot min)$. This resulted in an 11.8% to 14.3% increase in the concentration of dissolved oxygen in blood of a human subject after the treatments.

TABLE 1

Blood Lab Analysis after Saturated Oxygen Water Therapy

| Session Date | Red Blood Count (RBC) 4.20-5.60 × $10^{12}$/L | | Hemoglobin (HgB) 12.5-16.7 g/dl | | Hematocrit (HCT) 37.0-46.0% | |
| --- | --- | --- | --- | --- | --- | --- |
| Dec. 16, 2020 | 6.09 | H | 17.3 | H | 52.4 | H |
| Mar. 3, 2021 | 5.87 | H | 16.9 | H | 52.8 | H |
| Mar. 4, 2021 | 6.05 | H | 17.3 | H | 54.7 | H |
| Mar. 6, 2021 | 6.08 | H | 16.7 | H | 51.9 | H |
| Mar. 7, 2021 | 5.77 | H | 17.4 | H | 54.5 | H |
| Mar. 8, 2021 | 5.76 | H | 16.7 | H | 52.1 | H |
| Mar. 9, 2021 | 6.05 | H | 17.3 | H | 54.0 | H |
| Mar. 10, 2121 | 6.04 | H | 17.4 | H | 54.2 | H |
| Mar. 11, 2021 | 6.34 | H | 18.3 | H | 57.0 | H |

Legend
(N)-Normal
(H)-High
RBC, HgB, and HCT Ranges: (low to high)

Note Regarding Illustrative Examples

While the present disclosure provides descriptions of various specific aspects for the purpose of illustrating various examples of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative examples provided herein.

What is claimed is:

1. A method of increasing a concentration of dissolved oxygen in blood of a human subject, the method comprising:
producing an oxygen-water mixture;
using the oxygen-water mixture to produce saturated oxygen water;
using a catalytic oxygen capacitor to maintain dissolved oxygen in the saturated oxygen water at saturated oxygen equilibrium;
filling an open chamber with the saturated oxygen water;
inserting at least a portion of the human subject into the open chamber for a period of time; and
increasing the concentration of dissolved oxygen in blood of the human subject.

2. The method of claim 1, further comprising:
measuring the concentration of dissolved oxygen in blood of the human subject during or after the period of time.

3. The method of claim 2, wherein the measuring is performed using one or more of an arterial blood gas (ABG) test and a complete blood count (CBC) test.

4. The method of claim 2, wherein a rate of transmission of dissolved oxygen through the skin into the blood of the human subject is 2.5 ml $O_2$/(m2· min) to 4.5 ml $O_2$/(m2· min).

5. The method of claim 1, wherein the period of time is 1 to 60 minutes.

6. The method of claim 1, wherein the at least a portion of the human subject is selected from a group consisting of: an arm, a hand, an elbow, a leg, an ankle, a foot, a shoulder, a hip, a lower portion of a human body, and an entire human body except for the head.

7. The method of claim 1, wherein the inserting at least a portion of the human subject into the open chamber results in a removal of dead cells or contaminated cells from human tissue.

8. The method of claim 1, wherein the catalytic oxygen capacitor absorbs dissolved oxygen when the dissolved oxygen in the saturated oxygen water is at a concentration greater than saturated oxygen equilibrium.

9. The method of claim 1, wherein the catalytic oxygen capacitor releases dissolved oxygen when the dissolved oxygen in the saturated oxygen water is at a concentration less than a concentration in saturated oxygen equilibrium.

10. The method of claim 1, wherein the saturated oxygen equilibrium is a concentration of dissolved oxygen in saturated oxygen water that is at least 40 mg/l to 60 mg/l.

11. The method of claim 8, wherein the catalytic oxygen capacitor absorbs dissolved oxygen when the dissolved oxygen in the saturated oxygen water is at an equilibrium concentration greater than 60 mg/l.

12. The method of claim 9, wherein the catalytic oxygen capacitor releases dissolved oxygen when the dissolved oxygen in the saturated oxygen water is at a concentration less than 40 mg/l.

13. The method of claim 1, wherein the producing the oxygen-water mixture comprises:
passing water through a first oxygen injector; and
injecting oxygen gas into the water via the first oxygen injector to produce the oxygen-water mixture.

14. The method of claim 1, wherein the producing the oxygen-water mixture comprises:
passing water through a first oxygen injector;
injecting oxygen gas into the water via the first oxygen injector to produce a first oxygen-water mixture;
passing the first oxygen-water mixture through a second oxygen injector to produce a second oxygen water mixture.

15. The method of claim 1, wherein the using the oxygen-water mixture to produce saturated oxygen water comprises:
passing the oxygen-water mixture through a pressure pump.

16. The method of claim 1, wherein the using a catalytic oxygen capacitor to maintain dissolved oxygen in the saturated oxygen water at saturated oxygen equilibrium comprises:
passing the saturated oxygen water through a catalytic oxygen capacitor.

17. The method of claim 1, wherein the catalytic oxygen capacitor comprises a filter comprising absorption media.

18. The method of claim 17, wherein the absorption media is selected from a group consisting of: an activated carbon, an ion exchange resin, an organic absorbent, and an inorganic absorbent.

19. The method of claim 13, wherein the oxygen gas injected into the water or the oxygen gas injected into the first oxygen-water mixture flows in the same direction as the water or the first oxygen-water mixture.

20. The method of claim 15, further comprising:
passing the oxygen-water mixture through a static mixer before passing the oxygen-water mixture through the pressure pump, wherein the static mixer is configured to dissolve oxygen in the oxygen-water mixture without using an external energy source.

21. The method of claim 15, further comprising:
recirculating at least a portion of the saturated oxygen water to the pressure pump at least one time.

22. The method of claim 1, wherein the saturated oxygen water has a dissolved oxygen concentration of at least 50 up to 60 mg/l.

23. The method of claim 1, wherein the saturated oxygen water has a dissolved oxygen concentration of at least 55 up to 60 mg/l.

24. The method of claim 1, wherein the saturated oxygen water comprises nanobubbles comprising a diameter of less than 1 μm.

25. The method of claim 13, wherein the water is selected from a group consisting of municipal water, sea water, fresh water, aquaculture water, irrigation water, industrial water, tap water, well water, distilled water, purified water and wastewater.

26. The method of claim 13, wherein the oxygen gas comprises at least 99% oxygen.

27. The method of claim 1, wherein the open chamber is selected from a group consisting of: a tank, a bathtub, and a footbath.

28. The method of claim 1, further comprising:
providing water from a water source; and
providing oxygen gas from an oxygen source.

29. The method of claim 28, further comprising:
purifying the water to remove particulates, dissolved solids, ions, or a combination thereof.

* * * * *